(12) United States Patent
Schülke

(10) Patent No.: US 7,873,661 B2
(45) Date of Patent: Jan. 18, 2011

(54) NETWORK SYSTEM AS WELL AS A METHOD FOR CONTROLLING ACCESS FROM A FIRST NETWORK COMPONENT TO AT LEAST ONE SECOND NETWORK COMPONENT

(75) Inventor: Andreas Schülke, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 679 days.

(21) Appl. No.: 11/093,281

(22) Filed: Mar. 30, 2005

(65) Prior Publication Data

US 2005/0240658 A1 Oct. 27, 2005

Related U.S. Application Data

(60) Provisional application No. 60/557,690, filed on Mar. 31, 2004.

(30) Foreign Application Priority Data

Mar. 31, 2004 (DE) ........................ 10 2004 016 654

(51) Int. Cl.
*G06F 17/30* (2006.01)
*G06F 7/00* (2006.01)
(52) U.S. Cl. ........................ 707/783; 707/716; 707/966; 709/203; 709/219; 709/225
(58) Field of Classification Search ........................ None
See application file for complete search history.

(56) References Cited

U.S. PATENT DOCUMENTS

| | | | | |
|---|---|---|---|---|
| 5,315,657 A | | 5/1994 | Abadi et al. | |
| 5,649,099 A | * | 7/1997 | Theimer et al. | ................ 726/4 |
| 5,845,094 A | * | 12/1998 | Beauchamp et al. | ........ 710/100 |
| 6,012,099 A | * | 1/2000 | Chung | ........................ 709/249 |
| 7,111,052 B1 | * | 9/2006 | Cook | ........................ 709/219 |
| 2002/0064144 A1 | * | 5/2002 | Einola et al. | ................ 370/335 |
| 2003/0169155 A1 | * | 9/2003 | Mollenkopf et al. | ... 340/310.01 |
| 2004/0230797 A1 | * | 11/2004 | Ofek et al. | .................. 713/168 |

OTHER PUBLICATIONS

Deutsches Patent-und Markenamt Dec. 22, 2004.

* cited by examiner

*Primary Examiner*—Greta L Robinson
*Assistant Examiner*—James J Wilcox
(74) *Attorney, Agent, or Firm*—Harness, Dickey & Pierce, P.L.C.

(57) ABSTRACT

In a method for controlling access from a first network component to at least one second network component, a unique user identification for a user of the first network component is calculated by the first network component. A request created by the first network component on the basis of an order is transmitted with the unique user identification to the second network component. A rights checking instruction is created by the second network component on the basis of the unique user identification. The rights checking instruction is transmitted by the second network component to the first network component. Access for the user to the second network component is provisioned by the second network component when a transmitted result of a check indicates that the user is authorized for access to the second network component.

27 Claims, 4 Drawing Sheets

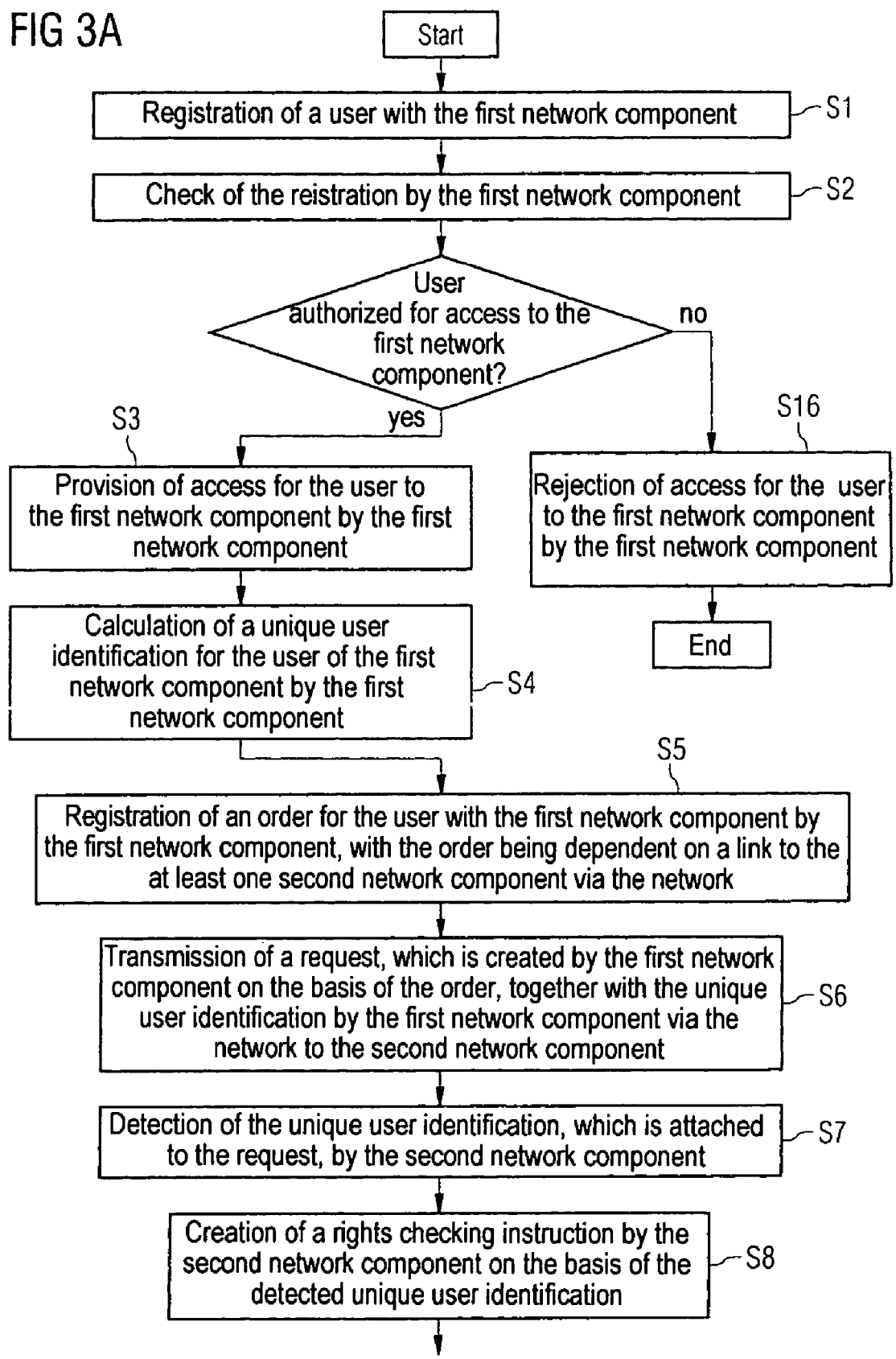

NETWORK SYSTEM AS WELL AS A METHOD FOR CONTROLLING ACCESS FROM A FIRST NETWORK COMPONENT TO AT LEAST ONE SECOND NETWORK COMPONENT

The present application hereby claims priority under 35 U.S.C. §119 on German patent application number DE 10 2004 016 654.4 filed Mar. 31, 2004, and on U.S. provisional patent application Ser. No. 60/557,690 filed Mar. 31, 2004, the entire contents of each of which are hereby incorporated herein by reference.

FIELD OF THE INVENTION

The present invention generally relates to a method for controlling access of a first network component to at least one second network component, and/or to a network system, such as one which is suitable for carrying out the method, for example.

The present invention furthermore generally relates to first and second network components which are designed for use in the network system.

BACKGROUND OF THE INVENTION

In a network system in which two or more computers are connected to one another via a network, it is frequently necessary, for example in the case of particularly time-consuming computation tasks to move the computation task to two or more other computers owing to the limited computation power of the individual computers in the network. Lack of memory capacities in the individual computers or a centrally located database may also necessitate network access. In this case, access and executive rights of the computers and devices in the network which are intended to be accessed must be taken into account in order, for example, to move the computation task.

A user is normally registered with a first computer that is connected to the network. If a time-consuming computation task is being carried out on this first computer, an application which is running on the first computer attempts to distribute the computation task between two or more second computers which are connected to the first computer via the network. For this purpose, the application which is running on the first computer sends appropriate orders via the network to the second computer, or to each of the second computers.

In order to make it possible to process the orders, it is normally necessary for the second computer or computers first of all to check on the basis of the access and/or executive rights of the user of the first computer whether that user is authorized for access to the second computer or computers. Various approaches are known for this purpose:

According to a first approach, the user is known and registered both with the first and with the second computer or computers. In this case, each computer can itself check the access and/or executive rights of the registered user.

In a second approach, the access and/or executive rights are managed centrally by a central computer in the network for the entire network, as a result of which the user of the first computer is known throughout the entire network via the central computer.

This approach is thus dependent on a configured computer network with a central computer for carrying out the checking of the access and/or executive rights.

A third already known solution approach is known by the name "Corba Call Chain" and will be described in more detail in the following text with reference to FIG. 4.

In the example shown in FIG. 4, a user wishes to use a user request 50 to access a target object 48 which is contained in a sub-domain 45 of a domain 40.

The user request 50 is first of all checked by an access controller 41 in the domain 40 to determine whether the user is authorized for access to objects 42, 43, 44 or sub-domain 45 which are contained in the domain 40.

If the user is authorized for access, the access controller 41 allows access to the domain 40. Otherwise, the access controller 41 for the domain 40 rejects access by the user, and rejects the passing on of the user request 50.

If the access controller 41 for the domain 40 allows access by the user, the user request 50 is passed on to the sub-domain 45 contained in the domain 40.

The user request 50 is then checked by an access controller 46 for the sub-domain 45 to determine whether the user is also authorized for access to objects 47, 48, 49 and sub-sub-domain (which are not shown in FIG. 4) contained in the sub-domain 45.

If the user is authorized for access to objects 47, 48, 49 which are contained in the sub-domain 45, then the access controller 46 for the sub-domain 45 allows access, and the user can access the target object 48, which is contained in the sub-domain 45, via the user request 50. Otherwise, the access controller 46 rejects access by that user to objects 47, 48, 49 which are contained in the sub-domain 45.

The Corba Call Chain is thus based on a chain of functional procedures as far as a target object. In order to check the access authorization, it is necessary to pass on the identity of the user, the identity of an access controller that is connected to the chain, or both the identity of the user and the identity of the access controller that is located in the chain, together with the user request. Transmission of this information is the only way to allow checking of the access authorization by the access controllers which are located in the chain.

As can clearly be seen from FIG. 4, the checking of the access authorization for the Corba Call Chain is always physically carried out within the chain at the location of the respective processing. The checking of the access authorization is thus carried out hierarchically before approval of access to a domain or sub-domain and by that computer to which access is intended.

U.S. Pat. No. 5,315,657 describes the determination of access rights to system resources in distributed network systems. An Access Control List (ACL) is disclosed there, on the basis of which the access rights of users who start orders are determined, to be precise on the basis of those rights which are recognized for the respective user. A personal key (private key) is used to identify the respective user; a further session key may additionally optionally be used, which identifies the respective session of a user.

The solution approaches which are already known from the prior art have various disadvantages, some of which are serious.

Registration of a user with all of the computers in a network which may possibly be accessed is associated with unacceptable complexity. Furthermore, multiple registration by the user results in the problem that the computers with which the user is registered cannot all be supervised at the same time, so that an unauthorized third party can easily gain unauthorized access to the network via an unsupervised registered computer. Furthermore, multiple registration of a user results in a very high risk of the user forgetting to log off from all the computers again after the task ends.

Central access control via a central computer for the network in turn involves the disadvantage that this is dependent on a network with a central computer, and the central computer as well as the computers that are connected in the network must be set up for central access control. In the event of a malfunction of the central computer, it may be impossible for any of the users to access the network. Furthermore, access authorizations are normally allocated by a system administrator on the central computer, so that this system is very inflexible.

The Corba Call Chain once again has the disadvantage that the identity of the client or at least the identity of the access controllers which are located in the chain must in each case be transferred together with the user request in order to check the access authorization. In consequence, the method is highly susceptible to manipulations since the information which is attached to the user request can easily be eavesdropped on and misused. Furthermore, the individual access controllers in the chain must know the access rights and/or executive rights which are associated with the identity of the respective user and with the access controllers which are located in the chain, so that it is highly complex and tedious to set up a Corba Call Chain. The Corba Call Chain is therefore very inflexible.

SUMMARY OF THE INVENTION

An object of at least one embodiment of the present invention is to provide a network system and/or a method for controlling access from a first network component to at least one second network component, which intrinsically has a high degree of flexibility and/or does not require any additional hardware components, with the greatest possible access security.

A further object of at least one embodiment of the present invention is to provide suitable first and second network components for the network system according to at least one embodiment of the invention.

According to an embodiment of the present invention, a method is proposed for controlling access from a first network component to at least one second network component, with the first network component and the at least one second network component being connected via a network, and the method comprising the following steps:

- calculation of a unique user identification for a user of the first network component by the first network component;
- registration of an order from the user to the first network component by the first network component, with the order being dependent on a link to the at least one second network component via the network;
- transmission of a request, which is created by the first network component on the basis of the order, together with the unique user identification by the first network component via the network to the second network component;
- detection of the unique user identification which is attached to the request, by the second network component;
- creation of a rights checking instruction by the second network component on the basis of the detected unique user identification;
- transmission of the rights checking instruction by the second network component via the network to the first network component;
- checking of the access authorization of the user to the second network component by the first network component on the basis of the rights checking instruction;
- transmission of a result of the check by the first network component via the network to the second network component; and
- provision of the access for the user to the second network component by the second network component when the transmitted result of the check indicates that the user is authorized for access to the second network component.

Thus, according to at least one embodiment of the present invention, no access and/or executive right that is associated with the respective user is transmitted by the transmission of the unique user identification. Instead, only a reference to the access and/or executive rights of the respective user is passed onto the respective first network component. The unique user identification is thus only evaluated by the second network component for the purpose of delegation of the checking of the access and/or executive rights of the user with regard to the second network component to the first network component, and not in order to take the access and/or executive rights of the user directly from the unique user identification.

Owing to the content of the unique user identification which is detected by the second network component, the physical checking of the access and/or executive rights is, according to at least one embodiment of the invention, delegated back from the second network component to the first network component. In consequence, the physical checking of the access and/or executive rights is carried out away from the direct access to the respective second network component.

The delegation of the checking of the access and/or executive rights of the user for the second network component from the second network component to the first network component by the creation and transmission of a rights checking instruction results in this method of at least one embodiment being extremely flexible, since there is no need for a central computer in the network and the respective user of the second network component need not actually be known. There is no need for configuration of the access and/or executive rights for the user on the second network component, or for registration of the user with the second network component. In consequence, the network can be extended in a flexible form and the first network component can distribute requests to any desired number of second network components.

Since, furthermore, no direct access and/or executive rights are transmitted together with the unique user identification, this can also not be intercepted and misused by an unauthorized third party, so that the method according to the invention ensures a high degree of security against manipulation.

The method according to at least one embodiment of the invention furthermore preferably has the following steps:

- registration of the user with the first network component;
- checking of the registration by the first network component; and
- provision of access for the user to the first network component by the first network component when the check indicates that the user is authorized for access to the first network component.

The checking of the authorization of the user for access to the first network component ensures that the access and/or executive rights of the user are recorded directly by the first network component, thus ensuring the actual identity of the user.

In this case, it is particularly advantageous for the calculation of the unique user identification for the user of the first network component to be carried out automatically immediately after the provision of the access for the user to the first network component.

The method of at least one embodiment furthermore may preferably include the following steps:

processing of the request by the second network component in order to obtain a request result;

transmission of the request result by the second network component via the network to the first network component; and emission of the received request result by the first network component to the user.

In this case, the steps of transmission of the request result by the second network component via the network to the first network component and the emission of the received request result by the first network component to the user are only facultative if the nature of the request result allows transmission and emission.

According to an embodiment of the present invention, the unique user identification includes the name of the user as well as a communication address for the first network component.

In consequence, the unique user identification provides the second network component with all of the information which is required for delegation of the checking of the access and/or executive rights of the user to the second network component from the second network component to the first network component.

In this case, it is also advantageous for the unique user identification to also indicate the domain of the first network component in the network.

According to one embodiment, the rights checking instruction which is created by the second network component includes individual access criteria for the respective second network component.

On the basis of the individual access criteria contained in the rights checking instruction, it is possible for the first network component to individually check the access and/or executive rights of the user of the first network component to the second network component for the respective second network component.

The steps of registration of the user with the first network component, checking of the registration by the first network component and provision of the access for the user to the first network component and/or calculation of a unique user identification for a user of the first network component and/or the checking of the access authorization of the user to the second network component are preferably carried out on the basis of the rights checking instruction and/or the transmission of the check result via the network to the second network component by a first access controller for the first network component.

In this case, it is particularly advantageous for the unique user identification to include the name of the user as well as a communication address for the first access controller.

The steps of registration of the order from the user with the first network component and/or of transmission of the request which is created on the basis of the order together with the unique user identification via the network to the second network component, and/or of the issue of the request result to the user are preferably carried out by way of a first application which runs on the first network component.

In this case, the first application produces the request by modification of the order produced by the user.

The steps of detection of the unique user identification which is attached to the request and/or of creation of a rights checking instruction on the basis of the unique user identification and/or of the transmission of the rights checking instruction via the network to the first network component and/or of provision of the access for the user to the second network component are preferably carried out by a second access controller for the second network component.

It is also advantageous if the steps of detection of the unique user identification which is attached to the request and/or of processing of the request in order to obtain a request result and/or of transmission of the request result via the network to the first network component are carried out by a second application for the second network component.

If the unique user identification which is attached to the request is detected by the second application for the second network component, then the format of the unique user identification can be chosen independently of the format which is normally used by the second access controller, since this can be converted by the second application. This makes the method according to at least one embodiment of the invention particularly flexible.

An object of at least one embodiment of the present invention may also be achieved by a computer program product which is suitable for carrying out a method of at least one embodiment when it is loaded in a computer.

Furthermore, an object of at least one embodiment may be achieved by a network system having at least one first network component which is connected via a network to at least one second network component, with the first network component having at least one first access controller as well as a first application, and the second network component having at least one second access controller, with the first access controller being designed in order to calculate a unique user identification for a user of the first network component, and to emit this to the first application;

the first application being designed in order to register an order from the user with the first network component, which is dependent on a link to the second network component via the network, to create a request on the basis of the order to the second network component and to transmit the request together with the unique user identification via the network to the second network component;

the second access controller being designed in order to create a rights checking instruction on the basis of the unique user identification, and to transmit the rights checking instruction via the network to the first access controller;

the first access controller being furthermore designed in order to check the access authorization of the user to the second network component on the basis of the received rights checking instruction, and to transmit a result of the check via the network to the second access controller; and the second access controller being furthermore designed in order to provide access for the user to the second network component when the result (which is transmitted from the first access controller) of the check indicates that the user is authorized for access to the second network component.

In this case, it is obvious that the transmission of the result of the check of the received rights checking instruction by the first access controller to the second access controller can take place not only directly but also indirectly via other elements of the second network component.

Furthermore, the first access controller is preferably designed in order to check registration of the user with the first network component and to provide access for the user to the first network component when the check shows that the user is authorized for access to the first network component.

It is particularly advantageous if the second network component furthermore has a second application which is designed in order to detect the unique user identification which is attached to the request and to emit this to the second access controller in order to create the rights checking instruction, and/or in order to process the request in order to obtain a request result and to transmit the request result via the network to the first application, and the first application is furthermore designed in order to emit the received request result to the user.

In this case, the transmission of the request result via the network to the first application and the emission of the received request result by the first application to the user are only facultative if the nature of the respective request result allows transmission and emission.

If the detection of the unique user identification which is attached to the request and the emission of the unique user identification which is attached to the request to the second access controller takes place for the purpose of creation of the rights checking instruction by the second application, then both the nomenclature of the request and the nomenclature of the unique user identification can be chosen independently of the nomenclature of the second access controller, since appropriate conversion can be carried out by the second application. This makes the network system according to at least one embodiment of the invention particularly flexible.

The unique user identification which is calculated by the first access controller preferably includes the name of the user as well as a communication address for the first access controller.

In this case, it is advantageous if the unique user identification which is calculated by the first access controller also indicates the domain of the first network component in the network.

The rights checking instruction which is created by the second network component preferably includes individual access criteria for the respective second network component.

Furthermore, an object may be achieved by a first network component for use in a network in which the first network component is connected via the network to at least one second network component having a first access controller which is designed in order to calculate a unique user identification for a user of the first network component and to emit this to a first application for the first network component, with the first application being designed in order to create an order for the user with the first network component, which is dependent on a link to the second network component via the network, to create a request to the second network component on the basis of the order and to transmit the request together with the unique user identification via the network to the second network component and with the first access controller furthermore being designed in order to check the access authorization of the user to the second network component on the basis of a rights checking instruction which is created by the second network component as a consequence of the transmitted unique user identification and is transmitted to the first network component, and to transmit a result of the check via the network to the second network component.

In this case, it is particularly advantageous if, furthermore, the first access controller is designed in order to check registration of the user with the first network component and to provide access for the user to the first network component when the check shows that the user is authorized for access to the first network component.

Furthermore, the first application is preferably designed in order to emit to the user a request result which is obtained by the second network component and is transmitted to the first network component.

The unique user identification which is calculated by the first access controller preferably includes the name of the user as well as a communication address for the first access controller, with the unique user identification which is calculated by the first access controller preferably also indicating the domain of the first network component in the network.

An object may also be achieved by a second network component for use in a network, in which the second network component is connected via the network to at least one first network component, the second network component having: [a second access controller in order to detect a unique user identification (which is attached to a request that is transmitted by the first network component) for a user of the first network component, to create a rights checking instruction on the basis of the unique user identification, and to transmit the rights checking instruction via the network to the first network component, with the second access controller furthermore being designed in order to provide access for the user to the second network component when a result which is transmitted by the first access controller of a check of the rights checking instruction indicates that the user is authorized for access to the second network component.

In this case, the detection of the unique user identification (which is attached to the request which is transmitted by the first network component) of a user of the first network component is detected by the second access controller both indirectly and directly.

Preferably, the second network component furthermore has a second application which is designed in order to detect the unique user identification which is attached to the request and to emit it to the second access controller in order to create the rights checking instruction, and/or in order to process the request in order to obtain a request result, and to transmit the request result via the network to the first network component.

Furthermore, it is advantageous if the rights checking instruction which is created by the second network component includes individual access criteria for the second network component.

BRIEF DESCRIPTION OF THE DRAWINGS

Example embodiments of the present invention will be described in more detail in the following text with reference to the attached drawings in which the same reference symbols denote identical elements. In the figures:

FIGS. 3a and 3b show a flowchart of the method according to the invention, based on one example embodiment.

DETAILED DESCRIPTION OF THE EXAMPLE EMBODIMENTS

Figure 1:
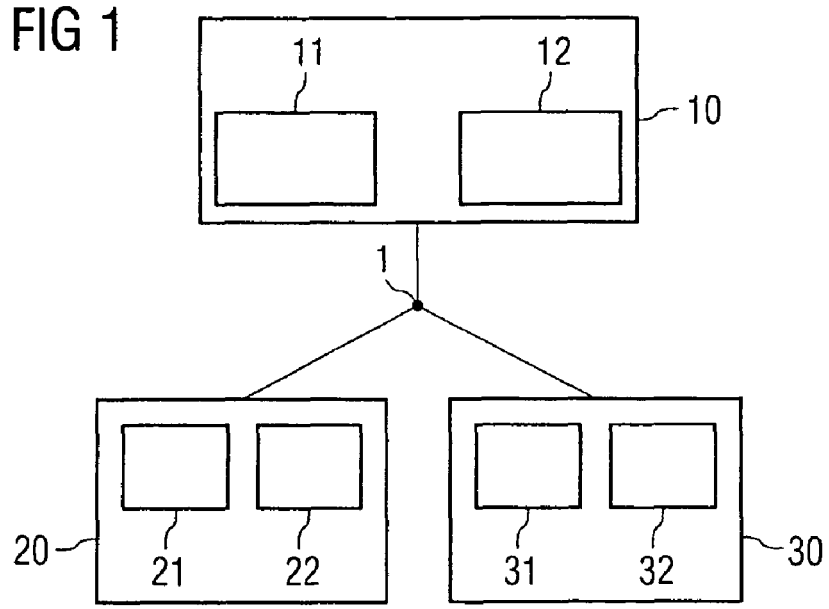
FIG. 1 shows, schematically, the design of the network system according to the invention, based on one example embodiment.

FIG. 1 shows, schematically, the design of a network system based on one example embodiment of the present invention.

The network system which is illustrated in FIG. 1 has a first network component 10, which is connected via a network 1 to two second network components 20 and 30.

In the illustrated particularly example embodiment, the first network component 10 and the second network components 20, 30 each have a first access controller 11, second access controllers 21 and 31, respectively, as well as a first application 12 and second applications 22 and 32, respectively.

In FIG. 1, the first network component 10 and the second network components 20 and 30 are computers which are networked with one another via the network 1. The first access controller 11 as well as the second access controllers 21, 31, respectively, and the first application 12 as well as the second applications 22, 32, respectively, are in this exemplary embodiment applications which run on the respective computers 10, 20, 30. Alternatively, the access controllers and/or the applications may, however, be, for example, in the form of microprocessor-controlled separate components.

Even if the network system that is illustrated in FIG. 1 connects only a single first network component 10 via the network 1 to two second network components 20, 30, any desired number of first network components can alternatively be connected via the network 1 to any desired number of second network components.

The first access controller 11 which is contained in the first network component 10 is designed in order to check registration of a user with the first network component 10 and to provide access for a user to the first network component 10 when the check results in the user being authorized for access to the first network component 10. The registration can be carried out, for example, by entering a password, in the generally normal manner for computers.

Furthermore, the first access controller 11 is designed in order to automatically calculate a unique user identification for a user for the first network component, and to emit this to the first application 12 for the first network component 10.

In the particularly preferred example embodiment that is shown in FIG. 1, the unique user identification which is calculated by the first access controller 11 includes the name of the user as well as a communication address for the first access controller 11, and also indicates the domain of the first network component 10 in the network 1. The unique user identification may thus, for example, be in the format <username>\<name of the domain of the first network component>\<computer name>\<port number of the access controller>.

In consequence, the unique user identification provides the second network component with all of the information which is required for delegation of the checking of the access and/or executive rights of the user for the second network component from the second network component to the first network component.

The first application 12 which is contained in the first network component 10 is designed in order to register an order from the user to the first network component 10 via a user interface which is not shown explicitly in FIG. 1 (via which the user can also be registered with the first access controller 11), for example a mouse or a keyboard, and to determine whether the order is dependent on a link from one or both of the second network components 20 and 30 via the network 1.

The link from one or from both of the second network components 20 and 30 via the network 1 may be required, for example, when the computation capacity or memory capacity of the first network component 10 is not sufficient for processing the order, or for processing of data which is stored in one or both of the second network components 20 and 30.

On the basis of the order, the first application 12 automatically creates a request, by suitable modification of the order, to one or both second network components 20, 30, and transmits the request together with the unique user identification, which is obtained from the first access controller 11, via the network 1 to one or both second network components 20, 30.

The second access controllers 21 and 31, respectively, for the second network components 20 and 30, respectively, are designed in the preferred example embodiment illustrated in FIG. 1 in order to detect the unique user identification (which is attached to the request that is transmitted from the first network component 10) of the user of the first network component 10, and to use the unique user identification to create a rights checking instruction.

In this case, the rights checking instruction contains individual access criteria to the respective second network components 20 and 30, so that different requirements can be placed on the approval of access by the user to the respective second network components 20 and 30 (for example on the basis of particularly sensitive data which is stored in one of the second network components 20 and 30).

According to one alternative embodiment (whose design corresponds, however, to the design shown in FIG. 1), the unique user identification which is attached to the request is detected by the second applications 22, 32 rather than by the second access controllers 21 and 31, respectively.

This has the advantage that the nomenclature of the unique user identification and of the request depends only on the second applications 22, 32, and not on the second access controllers 21, 31.

According to this alternative embodiment, a detected unique user identification is emitted automatically from the second applications 22, 32 to the respective second access controller 21 or 31, in order to create the rights checking instruction. The unique user identification may for this purpose be coded suitably in advance by the respective second application 22, 32.

The rights checking instruction which is created by the respective second access controller 21 or 31 for the respective second network components 20 or 30 is transmitted from the respective second network component 20 or 30 via the network 1 to the first access controller 11 for the first network component 10.

The first access controller 11 for the first network component 10 receives the transmitted rights checking instructions from the second network components 20 and 30, respectively, and uses the individual access criteria which are contained in the rights checking instruction, for the respective second network components 20 and 30, to check the access authorization for the user to the respective second network component 20 or 30.

The result determined in this way, which indicates whether the user of the first network component 10 is authorized for access to the respective second network component 20 or 30, is transmitted from the first access controller 11 via the network 1 to the respective second network component 20 or 30.

The respective second access controllers 21 and 31 for the respective second network components 20 and 30 provide access for the user of the first network component 10 to the second network component 20 or 30, depending on the content of a result which is transmitted from the first access controller 11 for the first network component 10.

If the user of the first network component 10 is authorized for access to the respective second network component 20 or 30, the request from the first application 12 for the first network component 10 is passed on automatically from the respective second access controller 21 or 31 to the respective second application 22 or 32 of the respective second network component 20 or 30 and is processed by it in order to obtain an appropriate request result.

The request result is transmitted automatically from the respective second application 22 or 32 of the respective second network component 20 or 30 via the network 1 to the first application 12 for the first network component 10 and is emitted from there by way of a suitable interface, which is not shown specifically in FIG. 1, for example a monitor or printer, to the user of the first network component 10.

It is obvious that the transmission of the request result from the respective second application 22 or 32 via the network 1 to the first application 12 and the emission of the received request result by the first application 12 to the user are only facultative, if the respective nature of the request result allows transmission and emission.

If, by way of example, the request includes a print order to the respective second application 22 or 32, in which case the print should be produced by the respective second application 22 or 32, then there is no point in transmitting the request result from the respective second application 22 or 32 via the network 1 to the first application 12 and in emitting the received request result by the first application 12 to the user.

Figure 2:
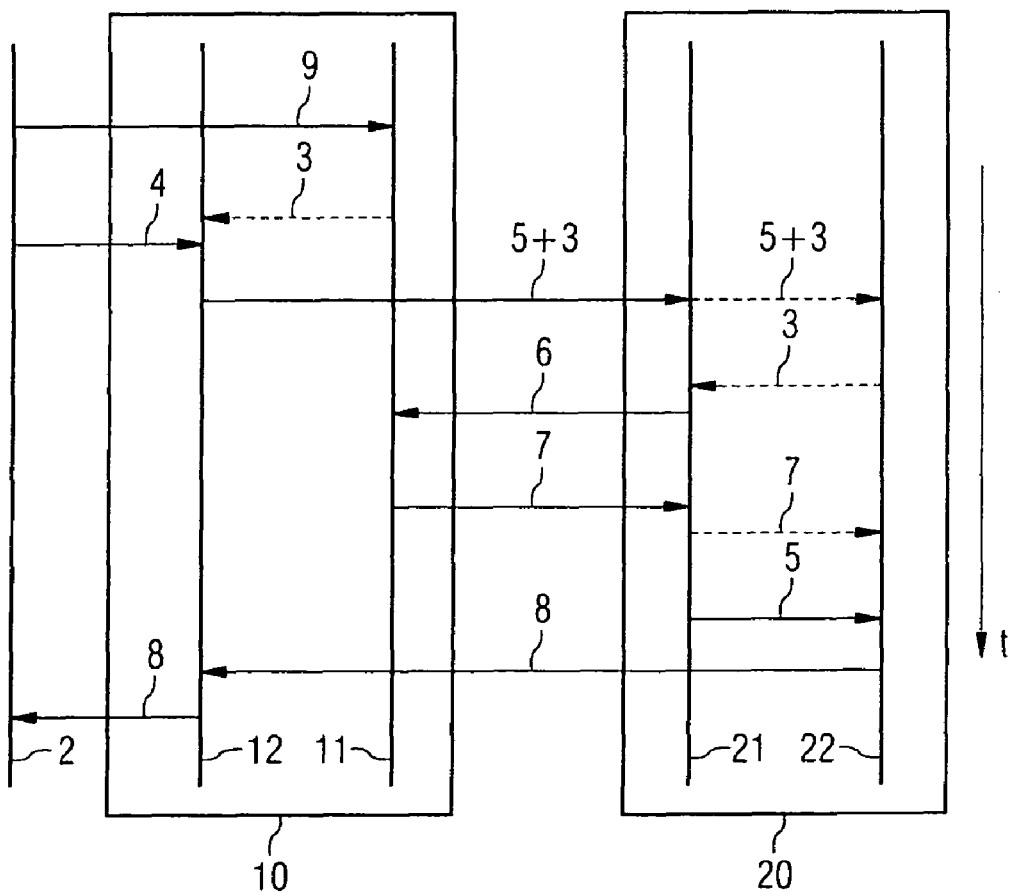
FIG. 2 shows a procedure plan of the method according to the invention in the network system according to the invention, based on the example embodiment.
Figure 3B:
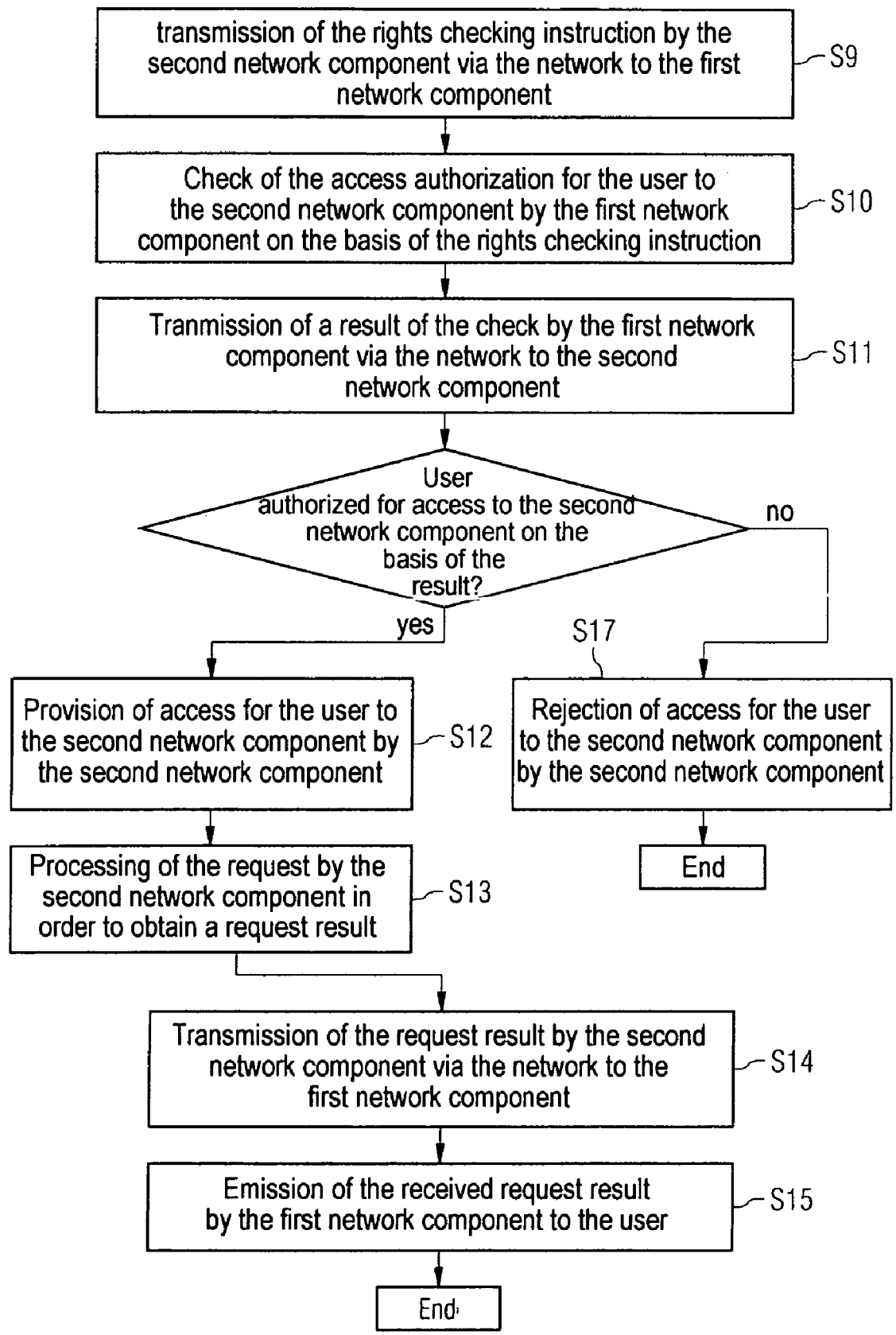
Figure 4:
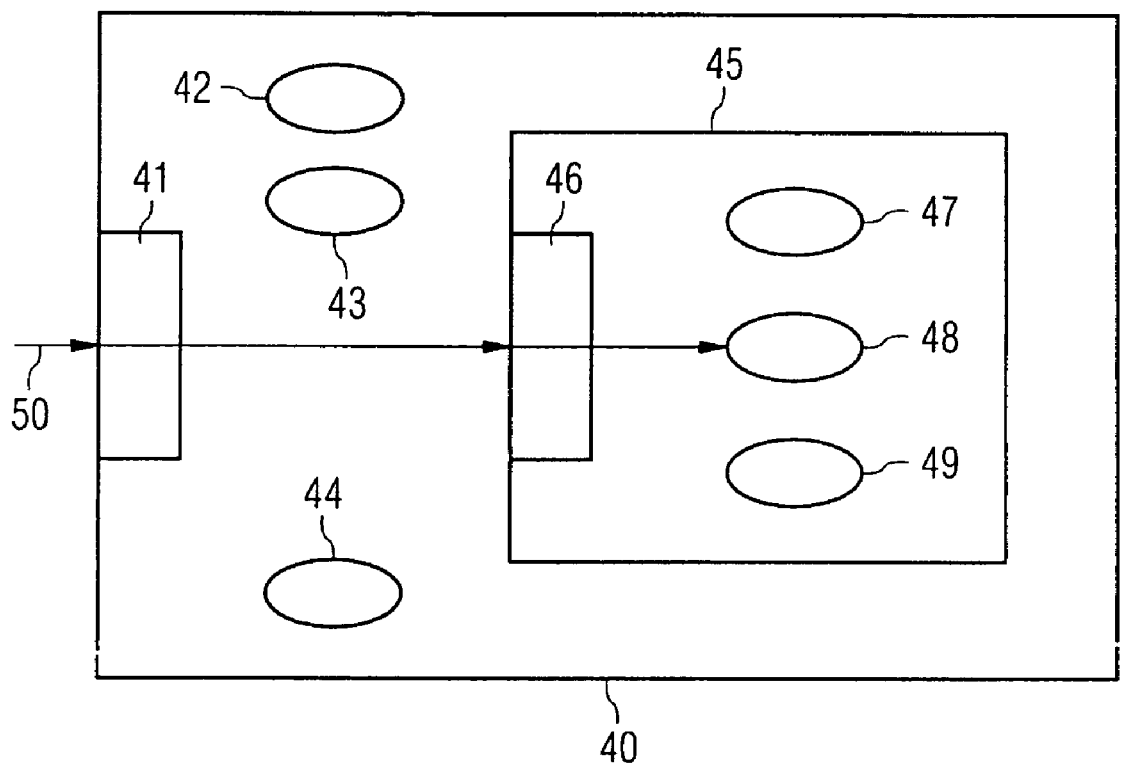
FIG. 4 shows a Corba Call Chain according to the prior art.

The method of operation of the network system according to an embodiment of the invention as shown in FIG. 1 will be explained in more detail in the following text with reference to the procedure plan that is shown in FIG. 2, and the flowchart which is shown in FIGS. 3a and 3b.

In a first step S1, a user 2 registers 9 with the first access controller 11 for the first network component 10.

In the next step S2, the registration 9 is checked by the first access controller 11.

If the first access controller 11 decides that the user 2 is authorized for access to the first network component 10, the first access controller 11 provides access for the user 2 to the first network component 10 in the step S3.

If, in contrast, the first access controller 11 decides that the user 2 is not authorized for access to the first network component 10 on the basis of the registration 9, then the first access controller 11 for the first network component 10 rejects the access for the user 2 to the first network component 10 in the step S16, and terminates the process.

If access for the user 2 to the first network component 10 has been set up in step S3, then the first access controller 11 automatically calculates, in the next step S4, a unique user identification 3 for the user 2 of the first network component 10, with the unique user identification 3 including the name of the user 2, a communication address for the first access controller 11 for the first network component 10, as well as the domain of the first network component 10 in the network.

In the next step S5, the first application 12 in the first network component 10 automatically registers an order 4 from the user 2, with the order 4 being dependent, by virtue of its nature, on a link to the at least one second network component 20 via the network.

The first application 12 in the first network component 10 then, in a step S6, produces a request 5 automatically by modification of the order 4, and transmits the request 5 that has been created in this way automatically together with the unique user identification 3 via the network to the second network component 20.

In this case, the unique user identification 3 for the first application 12 in the first network component 10 may, according to a first exemplary embodiment, have already been signaled by the first access controller 11.

Alternatively, the unique user identification 3 for the request 5 which is transmitted from the first application 12 is automatically added to the second network component 20 by the first access controller 11 during the transmission of the request 5, so that there is no need for the first access controller 11 to signal the unique user identification 3 to the first application 12.

The unique user identification 3 which is attached to the request 5 is automatically detected by the second access controller 21 for the second network component 20 in the step S7.

Alternatively, the request 5 can be transmitted together with the unique user identification 3 in the step S6 directly to the second application 22 in the second network component 20 as well, which detects the unique user identification which is attached to the request 5, in the step S7, and passes this on to the second access controller 21 in order to check the access authorization.

In the next step S8, the second access controller 21 uses the detected unique user identification 3 to automatically produce a rights checking instruction 6 based on individual access criteria for the second network component 20.

The second access controller 21 for the second network component 20 then transmits the rights checking instruction 6 automatically via the network to the first network component 10 in the step S9.

The rights checking instruction 6 which is transmitted from the second access controller 21 is received by the first access controller 11 for the first network component 10. In the step S10, the first access controller 11 automatically checks the access authorization of the user 2 for the second network component 20 on the basis of the rights checking instruction 6, taking into account the individual access criteria for the second network component 20, as contained in the rights checking instruction 6.

The result 7 of the check is automatically transmitted in the next step S11 from the first access controller 11 for the first network component 10 via the network to the second access controller 21 for the second network component 20.

The second access controller 21 checks whether the transmitted result 7 indicates that the user 2 is authorized for access to the second network component 10.

If this is not the case, the second access controller 21 rejects access by the user 2 to the second network component 20, in the step S17, and terminates the process.

Otherwise, the second access controller 21 provides access for the user 2 to the second network component 20, in the step S12.

Unless this has already been done in a previous stage, the second access controller 21 then transmits the request 5 to the second application 22. If necessary, during this process, the result 7 of the check of the access authorization for the user 2 to the second network component 20 can also be transmitted from the second access controller 21 to the second application 22.

When the result 7 of the check of the access authorization of the user 2 to the second network component 20 is transmitted from the second access controller 21 to the second application 22, the second application 22 then knows whether it may operate with the user 2 of the first network component 10.

In the next step S13, the second application 22 processes the request 5 in order to obtain a request result 8.

The request result 8 is then (step S14) transmitted from the second application 22 via the second access controller 21 and via the network to the first network component 10.

Such transmission of the request result 8 from the second application 22 to the first network component 10 takes place, of course, only when the nature of the request result 8 makes transmission necessary.

The request result 8 is received by the first application 12 in the first network component 10 via the first access controller 11, and is emitted to the user 2 of the first network component 10 in the step S15. This ends the process.

According to one example embodiment, the invention is implemented in the form of a computer program which is suitable for carrying out the method according to at least one embodiment of the invention when it is loaded in a computer.

Thus, according to at least one embodiment of the present invention, the transmission of the unique user identification 3 does not provide any access and/or executive right associated with the respective user 2, but only a reference to the access or executive rights of the respective user 2 on the respective first network component 10. The unique user identification 3 is thus evaluated by the second network component 20, 30 only for the purpose of delegation of the checking of the access and/or executive rights of the user 2 with regard to the second network component 20, 30 to the first network component 10, and not to take the access and/or executive rights of the user directly from the unique user identification 3.

The content of the unique user identification 3 which is detected by the second network component 20, 30 is used as the basis to delegate the physical checking of the access and/or executive rights back from the second network component 20, 30 to the first network component 10, according to at least one embodiment of the invention. In consequence, the physical checking of the access and/or executive rights is carried out externally to the direct access to the respective second network component 20, 30.

The delegation of the checking of the access and/or executive rights of the user with regard to the second network component 20,30 from the second network component 20, 30 to the first network component 10 by the creation and transmission of a rights checking instruction 6 results in the solution according to at least one embodiment of the invention being extremely flexible, since it does not require any central computer in the network 1 and the respective second network component 20, 30 need never know the respective user 2. There is therefore no need for configuration of the access and/or executive rights of the user 2 on the respective second network component 20, 30 or for registration of the user 2 with the respective second network component 20, 30. In consequence, the network 1 can be extended flexibly, and the first network component 10 can distribute requests to any desired number of second network components 20, 30.

Since, furthermore, no direct access and/or executive rights are transmitted together with the unique user identification 3, these can also not be intercepted and misused by an unauthorized third party, so that the solution according to at least one embodiment of the invention may permit, or even ensure, a high degree of security against manipulation.

The automatic checking of the authorization of the user 2 for access to the first network component 10 according to the preferred embodiment as described above is also ensured by the access and/or executive rights of the user 2 being detected correctly by the first network component 10 and the actual identity of the user 2 being ensured.

The individual access criteria which are preferably contained in the rights checking instruction 6 allow the first network component 10 to check the access and/or executive rights of the user 2 of the first network component 10 to the second network component 20, 30 individually for the respective second network component 20, 30.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as Mos; magnetism storage media, such as floppy disks (trademark), cassette tapes, and removable hard disks; media with a built-in rewriteable non-volatile memory, such as memory cards; and media with a built-in ROM, such as ROM cassettes.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for controlling access from a first network component to at least one second network component, the first network component and the at least one second network component being connected via a network, the method comprising:

calculating a unique user identification for a user of the first network component by the first network component;

registering an order from the user to the first network component by the first network component, the order being dependent on a link to the at least one second network component via the network;

transmitting a request, created by the first network component on the basis of the order, together with the unique user identification via the network to the second network component;

detecting the unique user identification, attached to the request, by the second network component;

creating, by the second network component, a rights checking instruction on the basis of the detected unique user identification, the rights checking instruction being an instruction for determining, by the first network component, whether the user is authorized to access the second network component;

transmitting, by the second network component, the rights checking instruction via the network to the first network component;

checking, by the first network component, whether the user is authorized to access the second network component on the basis of the rights checking instruction;

transmitting, by the first network component, a result of the check via the network to the second network component;

providing, by the second network component, access for the user to the second network component when the transmitted result of the check indicates that the user is authorized to access the second network component;

processing the result of the check to generate a request result;

transmitting the request result via the network to the first network component; and issuing the request result to the user; wherein the creating of the rights checking instruction by the second network component is separate from the providing of access for the user to the second network component, the registering is carried out via a first application running on the first network component, at least one of the transmitting the request to the second network component via the network and the issuing of the request result to the user are performed via a first application running on the first network component, the detecting the unique user identification attached to the request is carried out by a second application running on the second network component, at least one of the processing the request to generate a request result, and the transmitting the request result via the network to the first network component are performed by a second application running on the second network component, and the transmitting of the rights checking instruction from the second network component to the first network component delegates, to the first network component, physical checking of access rights of the user to the second network component such that the physical checking of the access rights is separate from direct access by the user to the second network component.

2. The method as claimed in claim 1, further comprising:
registering the user with the first network component;
checking the registration by the first network component; and
providing access for the user to the first network component when the check indicates that the user is authorized for access to the first network component.

3. The method as claimed in claim 2, wherein the calculation of the unique user identification for the user of the first network component is carried out immediately after the provisioning of the access of the user to the first network component.

4. The method as claimed in claim 1, wherein the unique user identification includes the name of the user and a communication address for the first network component.

5. The method as claimed in claim 4, wherein the unique user identification furthermore indicates the domain of the first network component in the network.

6. The method as claimed in claim 1, wherein the rights checking instruction, created by the second network component, includes individual access criteria for the respective second network component.

7. The method as claimed in claim 2, wherein the steps of registering the user with the first network component, checking the registration by the first network component and providing the access for the user to the first network component and at least one of calculating a unique user identification for a user of the first network component and checking the access authorization of the user to the second network component on the basis of the rights checking instruction, and transmitting the check result via the network to the second network component, are carried out by a first access controller for the first network component.

8. The method as claimed in claim 7, wherein the unique user identification includes the name of the user and a communication address for the first access controller.

9. The method as claimed in claim 1, wherein the first application produces the request by modification of the order.

10. The method as claimed in claim 1, wherein at least one of creating a rights checking instruction on the basis of the unique user identification and transmitting the rights checking instruction via the network to the first network component, and providing the access for the user to the second network component, are carried out by a second access controller for the second network component.

11. A computer program product, suitable for carrying out a method as claimed in claim 1 when it is loaded in a computer.

12. A network system, comprising:
at least one first network component including at least one first access controller and a first application; and
at least one second network component connected via a network to the at least one first network component and including a second application and at least one second access controller; wherein the first access controller is configured to,
calculate a unique user identification for a user of the first network component,
send the unique user identification to the first application,
check access authorization of the user to the second network component on the basis of a rights checking instruction received from the second network component, the rights checking instruction being an instruction for determining, by the first access controller, whether the user is authorized to access the second network component, and
transmit a result of the check via the network to the second access controller, the first application is configured to,
register an order from the user, the order being dependent on a link to the second network component via the network, and
create a request based on the order,
transmit the request together with the unique user identification via the network to the second network component, and
issue a request result received from the second network component to the user, the second access controller is configured to,
create the rights checking instruction based on the unique user identification, and
transmit the rights checking instruction via the network to the first access controller, and
provide access for the user to the second network component when the result of the check indicates that the user is authorized to access the second network component, wherein
the creating of the rights checking instruction is separate from the providing of access for the user to the second network component, and the second application is configured to,
process the result of the check received from the second access controller to generate a request result;
transmit the request result via the network to the first network component, and
the transmitting of the rights checking instruction from the second access controller to the first access controller delegates, to the first network component, physical checking of access rights of the user to the second network component such that the physical checking of the access rights is separate from direct access by the user to the second network component.

13. The network system as claimed in claim 12, wherein the first access controller is further designed to check registration of the user with the first network component and to provide access for the user to the first network component when the check shows that the user is authorized for access to the first network component.

14. The network system as claimed in claim 12, wherein the second application, is further configured to detect the unique user identification attached to the request and send the detected unique user identification to the second access controller.

15. The network system as claimed in claim 12, wherein the unique user identification, calculated by the first access controller, includes the name of the user and a communication address for the first access controller.

16. The network system as claimed in claim 15, wherein the unique user identification, calculated by the first access controller, further indicates the domain of the first network component in the network.

17. The network system as claimed in claim 12, wherein the rights checking instruction, created by the second network component, includes individual access criteria for the respective second network component.

18. A first network component for use in a network, the first network component being connected via the network to at least one second network component, the first network component comprising:
a first access controller; and
a first application; wherein
the first access controller is configured to,
calculate a unique user identification for a user of the first network component,
send the unique user identification to the first application,
check the access authorization of the user to the second network component based on a rights checking instruction created by, and received from, the second network component, the rights checking instruction being an instruction for determining, by the first network component, whether the user is authorized to access the second network component, wherein
the creating of the rights checking instruction by the second network component is separate from a providing of access for the user to the second network component, and
transmit a result of the check via the network to the second network component,
the first application is configured to,
create an order for the user with the first network component, the order being dependent on a link to the second network component via the network,
create a request to the second network component based on the order, and
transmit the request together with the unique user identification via the network to the second network component,
issue a request result to the user, the request result being received from the second network component in response to the transmitted result of the check, and
the rights checking instruction is transmitted from the second network component to the first network component to delegate, to the first network component, physical checking of access rights of the user to the second network component such that the physical checking of the access rights is separate from direct access by the user to the second network component.

19. The first network component as claimed in claim 18, wherein the first access controller is further configured to check registration of the user with the first network component and provide access for the user to the first network component when the check shows that the user is authorized for access to the first network component.

20. The first network component as claimed in claim 18, wherein the unique user identification, calculated by the first access controller, includes the name of the user and a communication address for the first access controller.

21. The first network component as claimed in claim 20, wherein the unique user identification, calculated by the first access controller, further indicates the domain of the first network component in the network.

22. A second network component for use in a network, the second network component being connected via the network to at least one first network component, the second network component comprising:
a second access controller; and
a second application; wherein
the second access controller is configured to,
detect a unique user identification for a user of the first network component,
create a rights checking instruction based on the unique user identification, the rights checking instruction being an instruction for determining, by the first network component, whether the user is authorized to access the second network component,
transmit the rights checking instruction via the network to the first network component,
provide access for the user to the second network component when a result of a check of the rights checking instruction received from the first access controller indicates that the user is authorized to access the second network component, wherein
the creating of the rights checking instruction is separate from the providing of access for the user to the second network component, and
the second application is configured to,
process the result of the check to generate a request result, and
transmit the request result via the network to the first network component for issuance to the user by the first network component, and
the transmitting of the rights checking instruction from the second network component to the first network component delegates, to the first network component, physical checking of access rights of the user to the second network component such that the physical checking of the access rights is separate from direct access by the user to the second network component.

23. The second network component as claimed in claim 22, wherein the second application is further configured to detect the unique user identification attached to the request and send the detected unique user identification to the second access controller.

24. The second network component as claimed in claim 22, wherein the rights checking instruction created by the second network component includes individual access criteria for the second network component.

25. The network system as claimed in claim 13, wherein the second network component is further configured to detect the unique user identification attached to the request and send the detected unique user identification to the second access controller.

26. The second network component as claimed in claim 23, wherein the rights checking instruction created by the second network component includes individual access criteria for the second network component.

27. A computer readable medium storing computer executable instructions that when executed on a computer, cause the computer to carry out the method as claimed in claim 1.

* * * * *